United States Patent [19]
Joyce

[11] 3,881,735
[45] May 6, 1975

[54] WORKHOLDER

[75] Inventor: Glover C. Joyce, Worcester, Mass.

[73] Assignee: The Warner & Swasey Company, Cleveland, Ohio

[22] Filed: Mar. 13, 1974

[21] Appl. No.: 450,666

[52] U.S. Cl. .................. 279/5; 51/237 CS; 82/40 A; 279/1 DC; 279/5; 279/6; 279/51
[51] Int. Cl. ............................................. B23b 5/34
[58] Field of Search .............. 279/4, 5, 6, 1 DC, 51; 51/237 CS, 105 SP; 82/40 A

[56] References Cited
UNITED STATES PATENTS

| | | | |
|---|---|---|---|
| 3,087,736 | 4/1963 | Lukas | 279/5 X |
| 3,142,941 | 8/1964 | Fournier et al. | 51/105 SP |
| 3,583,108 | 6/1971 | Oishi et al. | 51/237 R |
| 3,584,423 | 6/1971 | Hoare | 51/237 CS X |
| 3,680,876 | 8/1972 | Okada | 279/5 |
| 3,747,283 | 7/1973 | Price | 51/237 CS |

*Primary Examiner*—Andrew R. Juhasz
*Assistant Examiner*—W. R. Briggs

[57] ABSTRACT

An improved workholder is utilized to support a crankshaft with one of a plurality of crankpins in axial alignment with the axis of rotation of a spindle. The workholder includes a pot chuck which grips the crankshaft during a grinding operation in which the spindle rotates the crankshaft about a central axis of one of the crankpins. Upon completion of the grinding of one of the crankpins, an index pin is withdrawn from a first index opening in a chuck sleeve and the pot chuck is released. At this time, the crankshaft is held against movement relative to the index opening in the chuck sleeve by a collet chuck. The collet chuck and crankshaft are rotated together about an index axis to move a second crankpin into alignment with the axis of rotation of the spindle. As the second crankpin is moved into alignment with the spindle axis, the index pin is extended into a second index opening in the chuck sleeve to accurately locate the second crankpin relative to the spindle. The collet chuck is operated between an open condition and a closed condition by a piston and cylinder assembly.

16 Claims, 1 Drawing Figure

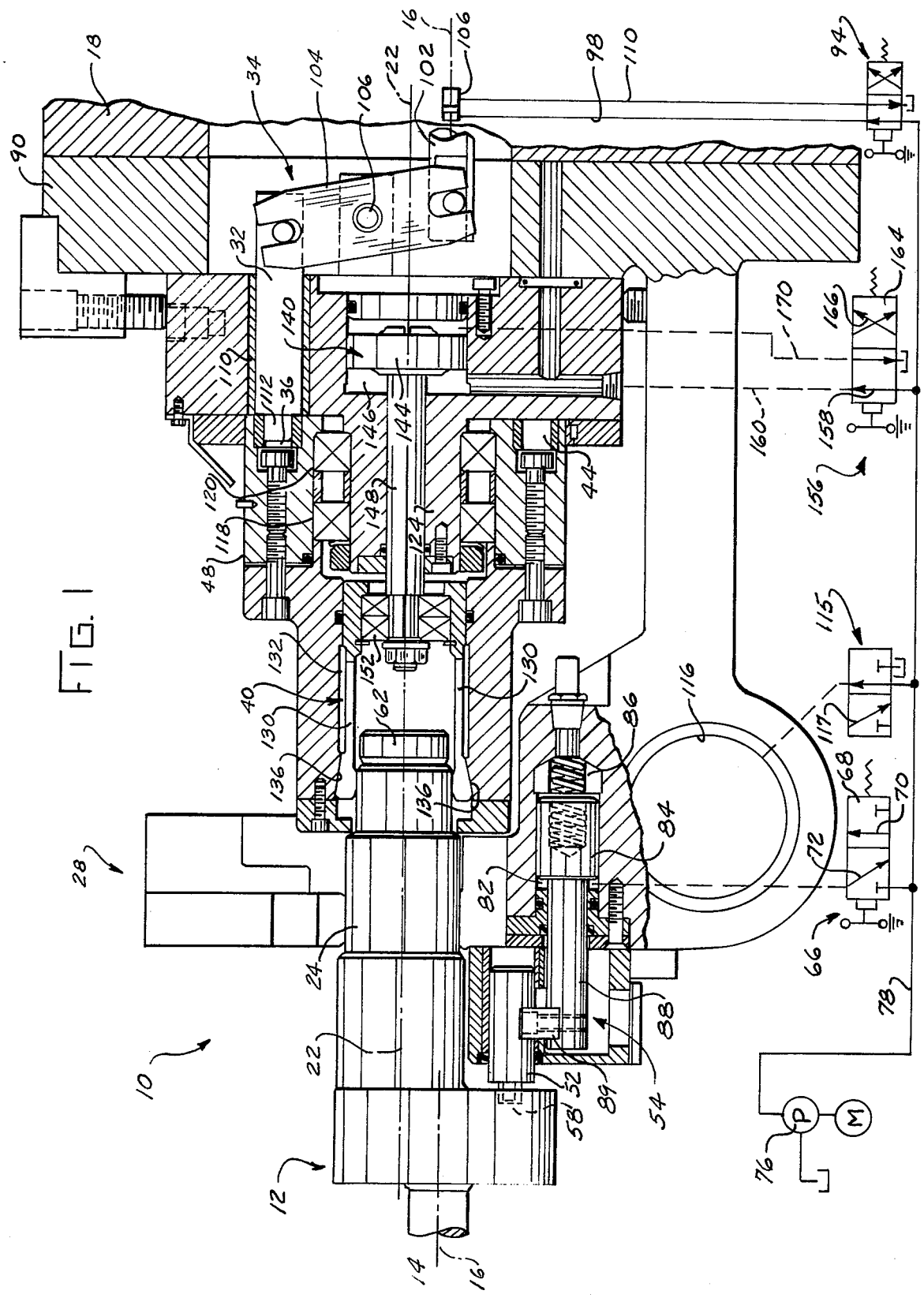

WORKHOLDER

BACKGROUND OF THE INVENTION

The present invention relates generally to a workholder and more specifically to a workholder for supporting a crankshaft with one of a plurality of crankpins in axial alignment with the axis of rotation of a spindle.

Engine crankshafts are commonly finished by grinding a crankpin as the crankshaft is rotated by a spindle mounted workholder. One known workholder includes a pot chuck which grips the crankshaft and holds it during the grinding operation. When one of the crankpins has been ground, the pot chuck of the known workholder is opened and a locating pin is withdrawn from a hole in a flange on a crankshaft. The crankshaft is then indexed and the locating pin moves into engagement with another hole in the crankshaft flange to accurately position the crankshaft with the next crankpin in axial alignment with the spindle. The pot chuck is then reengaged to hold the crankshaft in this position during grinding of the second crankpin.

Certain engine crankshafts do not have a flange with locating holes or notches to facilitate accurate indexing of the crankpins. Therefore, prior art workholders which relied upon sequential engagement of a locating pin with flange holes to sequentially align each of the crankpins are unsatisfactory for grinding crankshafts which do not have the necessary crankpin locating holes.

In an effort to overcome this problem, a known workholder has been provided with a cylindrical member which receives one end portion of the crankshaft. The crankshaft is to be indexed, a pot chuck is released and the crankshaft and cylindrical member are rotated together. As the crankshaft is rotated, an index plate is rotated with the crankshaft. When the index plate has been displaced through a desired distance, rotation of the crankshaft is stopped. The construction of this known workholder is more fully set forth in U.S. Pat. No. 3,680,876.

SUMMARY OF THE PRESENT INVENTION

The present invention provides an improved workholder which is utilized in association with a known grinding machine to support a crankshaft. The crankshaft is supported with one of a plurality of crankpins in axial alignment with the axis of rotation of a spindle during grinding of the aligned crankpin. As the crankpin is being ground, a main or pot chuck holds the crankshaft with the crankpin in axial alignment with the spindle. When the crankpin has been finished and a next crankpin is to be ground, the pot chuck is released and the crankshaft is rotated to move the next crankpin into alignment with the spindle. During this rotational movement of the crankshaft, a collect chuck holds the crankshaft against rotational movement relative to an index member. When the next crankpin has been moved into axial alignment with the spindle, an indexing pin moves into engagement with a hole or opening in the index member to accurately locate the crankpin. A locator pin or member is advantageously provided to engage a single locating hole or opening in the crankshaft to facilitate initial positioning of the crankshaft relative to the workholder.

Accordingly, it is an object of the present invention to provide a new and improved workholder which may be utilized to support crankshafts which do not have a flange and a locating hole or notch for correct angular indexing of each crankpin and wherein the workholder includes a main or pot chuck which holds the crankshaft during a grinding operation and a collet chuck which securely grips the crankshaft during an indexing operation.

Another object of this invention is to provide a new and improved workholder for supporting a crankshaft with one of a plurality of crankpins in axial alignment with the axis of rotation of a spindle and wherein the workholder includes an index arrangement for accurately locating the crankshaft and a collet chuck for maintaining a desired positional relationship between the crankshaft and the index arrangement during movement of crankpins into and out of grinding position.

BRIEF DESCRIPTION OF THE DRAWINGS

The foregoing and other objects and features of the present invention will become more apparent upon a consideration of the following description taken in connection with the accompanying drawing which is a sectional view illustrating the relationship between a workholder constructed in accordance with the present invention and a crankshaft.

DESCRIPTION OF ONE SPECIFIC PREFERRED EMBODIMENT OF THE INVENTION

A workholder 10 constructed in accordance with the present invention is utilized in association with a known grinding machine. The workholder 10 supports a rotary engine crankshaft 12 with one of two crankpins 14 in axial alignment with the axis of rotation 16 of a grinding machine spindle 18. As one crankpin 14 is being ground, it is rotated about the spindle axis 16 and is held against rotation relative to the spindle 18 about an axis 22 extending through a main journal or bearing 24 by a pot chuck 28.

When the crankpin 14 has been ground and another crankpin (not shown) is to be moved into alignment with the spindle axis 16, a pin 32 in an index assembly 34 is withdrawn from an index opening or hole 36 and the crankshaft 12 is rotated about the axis 22. During this rotational movement of the crankshaft 12, a collet chuck 40 holds the crankshaft against rotation relative to the index opening 36 and a second index opening 44 formed in a chuck body or sleeve 48. When the crankshaft 12 has been rotated through a distance sufficient to bring the next crankpin into alignment with the axis 16, the index pin 32 engages the hole 44 to accurately position the crankshaft.

A pin 52 in a locator assembly 54 is advantageously utilized to initially position the crankshaft relative to the index opening 36. Of course, the locator pin 52 is withdrawn from a hole or opening 58 in the crankshaft 12 before the crankshaft is indexed about the axis 22.

When the crankpins on the rotary engine crankshaft 12 are to be ground, the crankshaft is slid endwise into the workholder 10. During loading of the crankshaft, an outer end portion 62 of the crankshaft is moved into the open collet chuck 40. In addition, the main journal 24 is positioned in the opened pot chuck 28.

The crankshaft 12 is then moved to a predetermined angular position relative to the open pot and collet chucks 28 and 40 by rotating it about the axis 22 until the locator pin 52 is in axial alignment with the opening 58. A valve assembly 66 is actuated to effect movement of the locator pin 52 into the opening 58. Actuation of the valve assembly 66 moves a valve spool 68 from an initial position in which a valve passage 70 is effective to port fluid to the locator assembly 54 to the illustrated position in which the locator assembly 54 is connected with drain or reservoir through a valve passage 72. When the valve spool 68 is in the initial position, high pressure fluid from the charge pump 76 is ported from a conduit 78 to a cylinder 82 in the locator assembly 54. The fluid pressure in the cylinder 82 moves a locator piston 84 axially toward the right from the position illustrated in the drawing against the influence of a biasing spring 86.

Upon operation of the valve assembly 66 to the actuated position illustrated in the drawing, the passage 72 ports the cylinder 82 to drain so that the piston 84 is moved toward the left (as viewed in the drawing) by the biasing spring 86. This leftward movement of the piston 84 moves the locator pin 52 into engagement with the hole or opening 58 in the crankshaft 12. The locator pin 52 is connected with a piston rod 88 by a suitable mounting block 89.

Once the locator pin 52 has engaged the opening 58 in the crankshaft 12 with the index pin 32 in engagement with the index opening 36 (as shown in the drawing), the crankshaft 12 is accurately positioned relative to the index openings 36 and 44 and the spindle axis 16. This accurate crankpin positioning results from the fact that the locator pin 52 and index pin 32 are both accurately positioned relative to each other on a base 90. The locator opening 58 is accurately positioned relative to the crankpin 14 so that when the locator pin 52 is in engagement with the opening 58, one of the crankpins 14 is in axial alignment with the spindle axis 16. The other crankpin (not shown) is offset from this crankpin by 180°. The two index openings 36 and 44 are offset relative to each other by 180°. The index opening 36 is aligned with the index pin 32 when the locator pin 52 engages the opening 58 and the one crankpin 14 is aligned with the spindle axis. Therefore if no relative rotation occurs between the crankshaft 12 and chuck sleeve 48, the other crankpin will be in axial alignment with the spindle axis 16 when the index opening 44 is in axial alignment with the pin 32.

Once the crankshaft has been initially oriented by the locator assembly 54, the pot chuck 28 and collet chuck 40 are closed to securely grip the crankshaft. During subsequent grinding of the one crankpin 14, the crankshaft 12 is rotated about the spindle axis 16 which is offset from and extends parallel to the axis 22 extending through the main bearing or journal 24 of the crankshaft. Of course, the other crankpin is offset from the spindle axis 16 by 180°.

Upon completion of the grinding of one of the crankpins 14, the crankshaft 12 is indexed through 180° to position the unground crankpin in alignment with the spindle axis 16. Prior to indexing movement of the crankshaft 12 about the axis 22, the locator pin 52 is withdrawn from the opening 58 in the crankshaft, the pot chuck 28 is cracked or released, and the index pin 32 is withdrawn from the index opening 36. It should be noted that the collet chuck 40 was firmly closed before the pot chuck 28 was opened. Therefore, the crankshaft 12 is held against rotation relative to the chuck sleeve 48 and index openings 36 and 44 by the closed collet chuck 40.

Upon initiation of a crankshaft indexing operation, the valve assembly 66 is actuated to the initial position in which fluid under pressure is ported through the passage 70 to the cylinder 82. This effects rightward movement (as viewed in the drawing) of the piston 84 against the influence of the biasing spring 86. As the piston 84 is moved in the cylinder 82, the locator pin 52 moves out of engagement with the opening 58.

After the locator pin 52 has been withdrawn, a valve assembly 94 effects operation of the index assembly 34 to withdraw the index pin 32 from the index opening 36. Thus, when the valve assembly 94 is in the initial position shown in the drawing, high pressure fluid is being conducted through a conduit 98 to a hydraulic motor 100. This causes the motor 100 to continuously urge an actuator shaft 102 toward the right (as viewed in the drawing) so that a rocker arm 104 is pivoted about a connection 106 to press the index pin 32 into the opening 36. It should be noted that the actuator shaft 102 and motor 100 are axially aligned with the spindle and are not moved from the illustrated position by rotation of the spindle 18.

Upon actuation of the valve assembly 94, fluid under pressure is ported through a conduit 110 to effect operation of the motor 100 to pivot the rocker arm 104 in a clockwise direction about the connection 106. As the rocker arm is pivoted around the connection 106, the index pin 32 is slid axially toward the right (as viewed in the drawing) in a guide sleeve 110 to withdraw a nose portion 112 of the index pin from the opening 36. When the index pin 32 has been withdrawn from the opening 36, the chuck body or sleeve 48 is released for rotational movement about the axis 22 relative to the spindle mounted base 90 of the workholder 10.

After the index pin 32 has been disengaged from the opening 36, the pot chuck 28 is cracked or released so that the crankshaft 12 may be indexed to move another crankpin into alignment with the spindle axis 16. To release the pot chuck 28, a valve assembly 115 is actuated to connect an actuator assembly 116 with drain through a valve passage 117. The actuator assembly 116 is operated under the influence of a biasing spring to release the pot chuck 28 in the manner set forth in U.S. Pat. No. 3,404,492.

Once the pot chuck 28 has been released, the crankshaft 12 can be indexed either manually or by operation of a known indexing mechanism constructed in the manner disclosed in U.S. Pat. No. 3,142,941. During this indexing movement of the crankshaft 12, the closed collet chuck 40 holds the crankshaft against rotation relative to the chuck sleeve or body 48. Therefore the angular positional relationship of the index openings 36 and 44 relative to the crankpins 14 remain constant as the crankshaft 12 is rotated about the axis 22. The chuck sleeve 48 is supported for rotational movement relative to the workholder base 90 by a pair of bearing assemblies 118 and 120 which are disposed on an axially extending cylindrical portion 124 of the base.

As the crankshaft 12 is being indexed toward the position in which the central axis of the next succeeding crankpin 14 is closely approaching the spindle axis 16, the valve assembly 94 is actuated to effect operation of the motor 100 to urge the nose portion 112 of the index pin 32 against the chuck sleeve 48. When the next succeeding crankpin has been moved into exact axial alignment with the spindle axis 16, the nose portion 112 of the index pin 32 enters the second index opening 44 to hold the chuck sleeve 48 against further rotational movement relative to the base 90. It should be noted that this accurately positions the next succeeding crankpin relative to the spindle axis 16 since the collet chuck 40 has maintained the index openings 36 and 44 in a predetermined angular relationship with the crankshaft 12 as the crankshaft was indexed about the axis 22.

Once the index pin 32 has been moved into engagement with the index opening 44 to accurately locate the next crankpin in alignment with the spindle axis 16, the pot chuck 28 is closed to firmly grip the crankshaft 12. This is accomplished by actuating the valve 115 to the position shown in the drawing. This connects the pot chuck actuator 116 with the conduit 78 to port fluid pressure to the actuator assembly 116. The fluid pressure closes the pot chuck 28 firmly against the crankshaft 12.

The collet chuck 40 includes a plurality of longitudinally extending gripper fingers or jaws 130 which are disposed in an annular array about the axis 22 in a cylindrical chamber 132. When the collet chuck 40 is to be operated from a disengaged position in which it is ineffective to grip the crankshaft 12 to an engaged position (illustrated in the drawing) in which the collet chuck grips the crankshaft to hold it against rotation relative to the sleeve 48, the gripper fingers 130 are moved axially toward the right (as viewed in the drawing). During this rightward movement of the gripper fingers 130, a frustroconical cam surface 136 presses the gripper fingers inwardly against the end portion 62 of the crankshaft. This inward movement of the gripper fingers results in a tight clamping action in the manner generally similar to that described in U.S. Pat. No. 3,790,182.

The gripper fingers 130 are moved relative to the cam surface 136 by a collet actuator 140. The actuator assembly 140 includes a piston 144 slidabaly disposed in a chamber 146. A piston rod 148 is connected with the gripper fingers 130 by bearings 152 which enable the gripper fingers 130 to rotate relative to the piston rod with the chuck sleeve 48 upon indexing of the crankshaft 12.

When a valve assembly 158 is in the actuated position shown in the drawing, high pressure fluid is ported through a valve passage 158 to a conduit 160 connected with one end of the cylinder 146. Fluid pressure against the left end face (as viewed in the drawing) of the piston 144 urges the piston toward the right to pull the gripper fingers 130 against the cam surface 136. The inner action between the frustroconical cam surface 136 and the gripper fingers 130 urges them radially inwardly against the end portion 62 of the crankshaft 12 to hold the crankshaft against rotation relative to the chuck sleeve 48 and index openings 36 and 44.

When the collet chuck 40 is to be released, the valve assembly 156 is actuated to shift the valve spool 164 toward the left, as viewed in the drawing. This ports high pressure fluid from a valve passage 166 to a conduit 170 leading to the head end of the cylinder 146. The fluid pressure against the right end face (as viewed in the drawing) of the piston 144 causes the gripper fingers 152 to be moved axially toward the left. As the gripper fingers are moved toward the left, their natural resilience causes them to spring radially outward away from the end portion 62 of the crankshaft 12 to release the crankshaft.

The actuator assembly 140 is disposed in a coaxial relationship with the axis 22 about which the crankshaft 12 is indexed. Thus, upon rotation of the crankshaft 12 to move a finished crankpin out of axial alignment with the spindle axis 16 and to move an unfinished crankpin into alignment with the spindle axis 16, the gripper fingers 130 are rotated about the axis 22. The piston 144 and piston rod 148 remain motionless during rotation of the gripper fingers 130 and chuck sleeve 48 since the bearings 152 are ineffective to transmit rotational motion between the gripper fingers and the piston rod 148.

In view of the foregoing description it can be seen that the workholder 10 includes a main chuck 28 which is fixedly connected with the base 90, a collet chuck 40 which is rotatable with the chuck sleeve 48 relative to the base, and an indexing arrangement 34 for accurately positioning the collet chuck 40 relative to the base. Upon completion of a grinding operation on one of the crankpins 14, the main chuck 28 is cracked or released while the crankshaft 12 is held against rotation relative to the chuck sleeve 48 by the closed collet chuck 40. After the index pin 32 and locator pin 52 have been withdrawn, the crankshaft 12 is rotated or indexed about the axis 22. As this occurs, the collet chuck 40 and chuck sleeve 48 rotate about the axis 22. When an unfinished crankpin 14 has been moved into alignment with the spindle axis 16, the indexing pin 32 is extended to engage the index opening 44. The pot chuck 28 is then closed to firmly grip the crankshaft 12 to hold it against rotation during subsequent grinding of the unfinished crankpin.

Although the workholder 10 has been described herein in association with the crankshaft 12 of a rotary engine, it is contemplated that a workholder constructed in accordance with the present invention may be utilized in association with other types of crankshafts. The crankpins of these other crankshafts may be offset at more angular positions than the two angular positions of the crankshaft 12. Of course, the number of index openings in the index assembly 34 will correspond to the number of angular positions at which the crankpins are offset.

Having described a specific preferred embodiment of the invention, the following is claimed:

1. A workholder for supporting a crankshaft with one of a plurality of crankpins in axial alignment with the axis of rotation of a spindle, said workholder comprising a base adapted to be connected with the spindle for rotation therewith, main chuck means connected with said base for holding the crankshaft with one of the crankpins in axial alignment with the axis of rotation of the spindle, said main chuck means being operable between an engaged condition in which said main chuck means is effective to hold the crankshaft against rotation relative to said base and a released condition in which said main chuck means is ineffective to hold the crankshaft against rotation relative to said base, first actuator means for effecting operation of said main chuck means between said engaged and released conditions, a body connected with said base, means for supporting said body for rotation relative to said base about an index axis which is offest from and extends parallel to the axis of rotation of the spindle, second chuck means connected with said body for holding the crankshaft against rotation relative to said body during rotation of said body relative to said base about said index axis, said second chuck means being operable between an engaged condition in which said second chuck means is effective to hold the crankshaft against movement relative to said body and a released condition in which said second chuck means is ineffective to hold the crankshaft against movement relative to said body, second actuator means for effecting operation of said second chuck means between the engaged and released conditions, said body and second chuck means being rotatable relative to said base and first chuck means about said index axis with said second chuck means in the engaged condition and said first chuck means in the released condition to move said body from a first position in which one of the crankpins is in axial alignment with the axis of rotation of the spindle toward a second position in which another of the crankpins is in axial alignment with the axis of rotation of the spindle, and index means for accurately locating said body in the second position with the other crankpin in axial alignment with the axis of rotation of the spindle.

2. A workholder as set forth in claim 1 wherein said second chuck means includes a plurality of gripper fingers and cam surface means for pressing said gripper fingers inwardly against the crankshaft to grip the crankshaft, said second actuator means including means for moving said gripper fingers relative to said cam surface means.

3. A workholder as set forth in claim 1 wherein said second chuck means includes a plurality of longitudinally extending fingers disposed in an annular array about the index axis and adapted to move longitudinally relative to said body, and cam surface means connected with said body for forcing said fingers radially inwardly upon relative movement between said fingers and said cam surface means, said actuator means including means for moving said fingers longitudinally relative to said cam surface means to effect operation of said second chuck means between the engaged and released conditions.

4. A workholder as set forth in claim 1 wherein said second actuator means includes a piston and cylinder assembly connected with said second chuck means and means for porting fluid under pressure to said piston cylinder assembly to effect operation of said piston and cylinder assembly to actuate said second chuck means between the engaged and released conditions.

5. A workholder as set forth in claim 1 wherein said second chuck means includes a plurality of gripper elements movable toward and away from the index axis, said second actuator means including means for effecting movement of said gripper elements toward the index axis to effect operation of said second chuck means from the released condition to the engaged condition and for effecting movement of said gripper elements away from the index axis to effect operation of said second chuck means from the engaged condition to the released condition.

6. A workholder as set forth in claim 5 wherein said second actuator means includes a piston and cylinder assembly connected with said base and disposed in a coaxial relationship with the index axis and means for connecting said piston and cylinder assembly with said gripper elements and for enabling said gripper elements to rotate relative to said piston and cylinder assembly during rotation of said body and second chuck means relative to said base.

7. A workholder as set forth in claim 1 further including locator means for engaging the crankshaft to locate the crankshaft with the one crankpin in axial alignment with the axis of rotation of the spindle when said body is in said first position.

8. A workholder as set forth in claim 7 wherein said indexing means includes means for accurately locating said body in the first position when said locator means is in engagement with the crankshaft.

9. A workholder as set forth in claim 8 further including mounting means for mounting said locator means in a fixed positional relationship with said base, said body being movable relative to said locator means from said first position to said second position.

10. A workholder as set forth in claim 7 wherein said locator means includes a movable member and piston and cylinder means for moving said member between an extended position in which said member engages the crankshaft and a retracted position in which said member is spaced apart from the crankshaft.

11. A workholder as set forth in claim 10 further including valve means for porting fluid to said piston and cylinder means to effect movement of said member from said extended position to said retracted position when said body is in said first position.

12. A workholder for supporting a crankshaft with one of a plurality of crankpins in axial alignment with the axis of rotation of a spindle, said workholder comprising a base adapted to be connected with the spindle for rotation therewith, locator means connected with said base for engaging the crankshaft to locate the crankshaft with one of the crankpins in axial alignment with the spindle, said locator means including a locator member movable relative to said base between an extended position in which said locator member engages the crankshaft and a retracted position in which said locator member is spaced apart from the crankshaft, first actuator means for effecting movement of said locator member between the extended and retracted positions, a body connected with said base, means for supporting said body for rotation relative to said base about an index axis which is offset from and extends parallel to the axis of rotation of the spindle, chuck means connected with said body for holding the crankshaft against rotation relative to said body during rotation of said body relative to said base about the index axis, said chuck means being operable between an engaged condition in which said chuck means is effective to hold the crankshaft against movement relative to said body and a released condition in which said chuck means is ineffective to hold the crankshaft against movement relative to said body, and second actuator means for effecting operation of said chuck means from the released condition to the engaged condition when said locator member is in the extended position and the one crankpin is in axial alignment with the spindle, said body and chuck means being rotatable about said index axis relative to said base with said chuck means in the engaged condition and said locator member in the retracted position to move said body from a first position in which one of the crankpins is in axial alignment with the axis of rotation of the spindle to a second position in which another of the crankpins is in axial alignment with the axis of rotation of the spindle.

13. A workholder as set forth in claim 12 further including index means for accurately locating said body in the first position relative to said base with said chuck means in the released condition and said locator member in the extended position and for accurately locating said body in the second position relative to said base with said chuck means in the engaged condition and said locator member in the retracted position.

14. A workholder as set forth in claim 12 wherein said first actuator means includes fluid motor means connected with said base and valve means for porting fluid to effect operation of said fluid motor means to move said locator member from the retracted position to the extended position with said chuck means in the released condition and for porting fluid to effect operation of said fluid motor means to move said locator member from the extended position to the retracted position with said chuck means in the engaged condition.

15. A workholder as set forth in claim 12 further including second chuck means connected with said base for holding the crankshaft with the one crankpin in axial alignment with the axis of rotation of the spindle when said body is in said first position and for holding the crankshaft with the other crankpin in axial alignment with the axis of rotation of the spindle when said body is in the second position.

16. A workholder for supporting a crankshaft with one of a plurality of crankpins in axial alignment with the axis of rotation of a spindle, said workholder comprising a base adapted to be connected with the spindle for rotation therewith, main chuck means connected with said base for holding the crankshaft with one of the crankpins in axial alignment with the axis of rotation of the spindle, said main chuck means being operable between an engaged condition in which said main chuck means is effective to hold the crankshaft against rotation relative to said base and a released condition in which said main chuck means is ineffective to hold the crankshaft against rotation relative to said base, first actuator means for effecting operation of said main chuck means between said engaged and released conditions, a body connected with said base and disposed between said main chuck means and a portion of said base, means for supporting said body for rotation relative to said base about an index axis which is offset from and extends parallel to the axis of rotation of the spindle, second chuck means connected with said body and disposed between said main chuck means and a portion of said base for holding the crankshaft against rotation relative to said body during rotation of said body relative to said base about said index axis, said second chuck means including a plurality of gripper elements disposed in an annular array about and movable toward and away from the index axis, second actuator means for effecting movement of said gripper elements toward the index axis to grip the crankshaft and hold it against movement relative to said body during rotation of said body relative to said base from a first position in which one of the crankpins is in axial alignment with the axis of rotation of the spindle to a second position in which another of the crankpins is in axial alignment with the axis of rotation of the spindle, said second actuator means being operable to effect movement of said gripper elememts away from the index axis to release the crankshaft for rotation relative to said body, said second actuator means including a piston and cylinder assembly connected with said gripper elements, and index means for accurately locating said body relative to said base when said body is in said first position and for accurately locating said body relative to said base when said body is in said second position.

* * * * *